United States Patent
Cheung et al.

(10) Patent No.: US 8,527,712 B2
(45) Date of Patent: Sep. 3, 2013

(54) REQUEST TO OWN CHAINING IN MULTI-SOCKETED SYSTEMS

(75) Inventors: Connie Wai Mun Cheung, Sunnyvale, CA (US); Madhavi Kondapaneni, Cupertino, CA (US); Joann Yin Lam, San Francisco, CA (US); Ramaswamy Sivaramakrishnan, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 184 days.

(21) Appl. No.: 13/220,286

(22) Filed: Aug. 29, 2011

(65) Prior Publication Data

US 2012/0290794 A1 Nov. 15, 2012

Related U.S. Application Data

(60) Provisional application No. 61/486,197, filed on May 13, 2011.

(51) Int. Cl.
*G06F 12/04* (2006.01)

(52) U.S. Cl.
USPC .......................................... 711/144; 711/145

(58) Field of Classification Search
None
See application file for complete search history.

(56) References Cited

U.S. PATENT DOCUMENTS

| | | | |
|---|---|---|---|
| 7,774,552 B1 | 8/2010 | Cypher et al. | |
| 2004/0162951 A1 | 8/2004 | Jacobson et al. | |
| 2010/0281220 A1* | 11/2010 | Cantin et al. | 711/130 |
| 2011/0296096 A1* | 12/2011 | Zou et al. | 711/105 |
| 2012/0265942 A1* | 10/2012 | Cantin et al. | 711/144 |

FOREIGN PATENT DOCUMENTS

WO 2007/027365 A1 3/2007

OTHER PUBLICATIONS

International Serach Report Issued in PCT/US2012/035757, Dated Jul. 23, 2012 (2 Pages).
Written Opinion of the International Searching Authority issued in PCT/US2012/035757, Dated Jul. 23, 2012 (4 Pages).

* cited by examiner

*Primary Examiner* — Than Nguyen
(74) *Attorney, Agent, or Firm* — Osha Liang LLP (57) ABSTRACT

A method including: receiving multiple local requests to access the cache line; inserting, into an address chain, multiple entries corresponding to the multiple local requests; identifying a first entry at a head of the address chain; initiating, in response to identifying the first entry and in response to the first entry corresponding to a request to own the cache line, a traversal of the address chain; setting, during the traversal of the address chain, a state element identified in a second entry; receiving a foreign request to access the cache line; inserting, in response to setting the state element, a third entry corresponding to the foreign request into the address chain after the second entry; and relinquishing, in response to inserting the third entry after the second entry in the address chain, the cache line to a foreign thread after executing the multiple local requests.

20 Claims, 6 Drawing Sheets

REQUEST TO OWN CHAINING IN MULTI-SOCKETED SYSTEMS

CROSS-REFERENCE TO RELATED APPLICATIONS

This application is a non-provisional of U.S. Provisional Application No. 61/486,197, filed on May 13, 2011, and entitled: "Request to Own Chaining in Multi-Socketed Systems." Accordingly, this application claims priority to U.S. Provisional Application No. 61/486,197 under 35 U.S.C. §119(e). U.S. Provisional Application No. 61/486,197 is hereby incorporated by reference in its entirety.

BACKGROUND

A thread is the smallest unit of processing that can be scheduled for execution. Accordingly, a thread may be regarded as a sequence of instructions, including instructions to access (i.e., read from and/or write to) cache lines. Many computer systems have two or more multithreaded processors concurrently executing multiple threads. Although, in general, by having multiple multithreaded processors the performance of the computer system improves, concurrent attempts to access the same cache line among threads can pose performance problems depending on the order in which the threads are granted access. This is due to the long latency associated with an inter-socket cache line transfer. Despite the existence of this inter-socket cache line transfer latency, computer system architectures with multiple multithreaded processors remain in wide-spread use.

SUMMARY

In general, in one aspect, the invention relates to a method for managing a cache line. The method comprises: receiving, from a plurality of local threads executing on a local multithreaded processor, a plurality of local requests to access the cache line; inserting, into an address chain associated with the cache line, a plurality of entries corresponding to the plurality of local requests; identifying a first entry of the plurality of entries at a head of the address chain; initiating, in response to identifying the first entry at the head and in response to the first entry corresponding to a request to own (RTO) the cache line, a traversal of the address chain; setting, during the traversal of the address chain, a state element identified in a second entry of the plurality of entries, wherein the state element corresponds to a serialization acknowledgement from a central ordering unit for a local request corresponding to the second entry; receiving, from a foreign thread executing on a foreign multithreaded processor, a foreign request to access the cache line; inserting, in response to setting the state element, a third entry corresponding to the foreign request into the address chain after the second entry; and relinquishing, in response to inserting the third entry after the second entry in the address chain, the cache line to the foreign thread after executing the plurality of local requests.

In general, in one aspect, the invention relates to a non-transitory computer readable storage medium storing instructions for managing a cache line. The instructions comprise functionality to: receive, from a plurality of local threads executing on a local multithreaded processor, a plurality of local requests to access the cache line; insert, into an address chain associated with the cache line, a plurality of entries corresponding to the plurality of local requests; identify a first entry of the plurality of entries at a head of the address chain; initiate, in response to the first entry being indentified at the head and in response to the first entry corresponding to a request to own (RTO) the cache line, a traversal of the address chain; set, during the traversal of the address chain, a state element identified in a second entry of the plurality of entries, wherein the state element corresponds to a serialization acknowledgement from a central ordering unit for a local thread corresponding to the second entry; receive, from a foreign thread executing on a foreign multithreaded processor, a foreign request to access the cache line; insert, in response to the state element being set, a third entry corresponding to the foreign request into the address chain after the second entry; and relinquish, in response to the third entry being inserted after the second entry in the address chain, the cache line to the foreign thread after executing the plurality of local requests.

In general, in one aspect, the invention relates to a system for managing a cache line. The system comprises: a plurality of local threads executing on a local multithreaded processor and issuing a plurality of local requests to access the cache line; a foreign thread executing on a foreign multithreaded processor and issuing a foreign request to access the cache line; and a local cache storing the cache line and comprising an address chain storing a plurality of local entries corresponding to the plurality of local requests and a foreign entry corresponding to the foreign request, wherein the local cache is configured to set, during a traversal of the address chain, a state element identified in the plurality of local entries and corresponding to a serialization acknowledgement from a central ordering unit, wherein the foreign entry is inserted into the address chain after the plurality of local entries in response to the state element being set, and wherein the cache line is relinquished to the foreign thread after the plurality of local requests are executed in response to the foreign entry being inserted into the address chain after the plurality of local entries.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing cache lines. Specifically, a cache line is retained in a cache of a local multithreaded processor until all the local requests (i.e., requests issued by threads executing on the local multithreaded processor) are processed. It is only after processing the local requests that the cache line is relinquished to a foreign request issued by a foreign thread executing on a foreign processor. In one or more embodiments of the invention, the local multithreaded processor includes an address chain corresponding to the cache line and storing local entries corresponding to the local requests. State elements identified by the local entries are deliberately set to force an entry corresponding to a foreign request to be inserted at the end (i.e., tail) of the address chain, and thus be processed after the local requests are processed.

Figure 1:
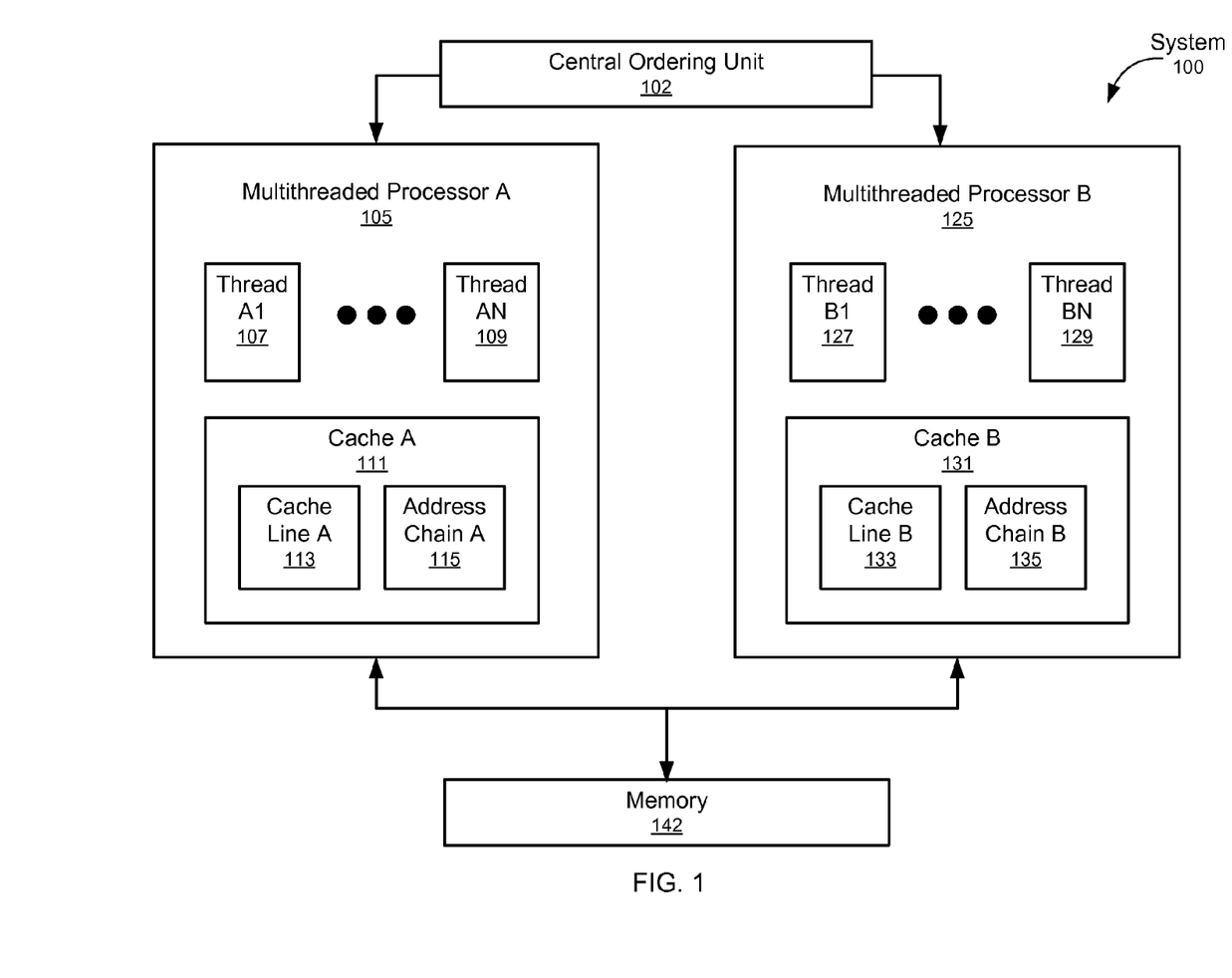
FIG. 1 shows a system in accordance with one or more embodiments of the invention.

FIG. 1 shows a multi-socketed system (100) in accordance with one or more embodiments of the invention. As shown in FIG. 1, the multi-socketed system (100) has multiple components including a central ordering unit (102), a memory (142), and one or more multithreaded processors (i.e., Multi-threaded Processor A (105), Multithreaded Processor B (125)) executing one or more threads (i.e., Thread A1 (107), Thread AN (109), Thread B1 (127), Thread BN (129)). Further, each multithreaded processor (105, 125) includes a cache (i.e., Cache A (111), Cache B (131)) storing one or more cache lines (i.e., Cache Line A (113), Cache Line B (133)) and one or more address chains (i.e., Address Chain A (115), Address Chain B (135)).

In one or more embodiments of the invention, the threads (107, 109, 127, 129) include instructions (i.e., requests) to access (i.e., read from and/or write to) one or more locations in the memory (142). These memory locations may store shared resources (e.g., locks, global variables, etc.) that are accessible to multiple threads and/or private variables that are only accessible to a specific thread. In order to expedite execution of these instructions, the contents of the memory addresses may be locally stored in the caches (111, 131), which have faster access times than the memory (142). Specifically, each cache line (113, 133) corresponds to a block of locations in the memory (142) and is a local copy of the contents (i.e., shared resources, private variables, etc.) in the block of locations.

In one or more embodiments of the invention, if a local cache (i.e., Cache A (111)) is not storing the contents of a memory address requested by a local thread (e.g., Thread A1 (107)), the corresponding cache line is transferred from a foreign cache (i.e., Cache B (131)) storing the cache line (i.e., the foreign thread relinquishes the cache line). However, if no foreign cache is storing the cache line, the cache line is retrieved from the memory (142).

In one or more embodiments of the invention, concurrent attempts to access the same cache line among threads (107, 109, 127, 129) can pose performance problems depending on the order in which the threads are granted access. This is due to the long latency associated with an inter-socket cache line transfer (i.e., transferring between a foreign cache to/from a local cache).

For example, suppose Thread A1 (107) has write access to Cache Line A (113) containing a global variable, and Thread AN (109) has instructions to store into the same global variable. It may take 10 ns-20 ns for Thread AN (109) to get the write access from Thread A1 (107). However, if Thread B1 (127) has instructions to store into the same global variable, the inter-processor transfer (i.e., transfer of Cache Line A (113) to Cache B (131)) can take more than 100 ns. To improve the overall latency seen by all the threads, it is more efficient to amortize the latency of bringing in a cache line into a multithreaded processor over more threads that are local to that multithreaded processor, before relinquishing it to threads that are foreign to that multithreaded processor.

Figure 2:
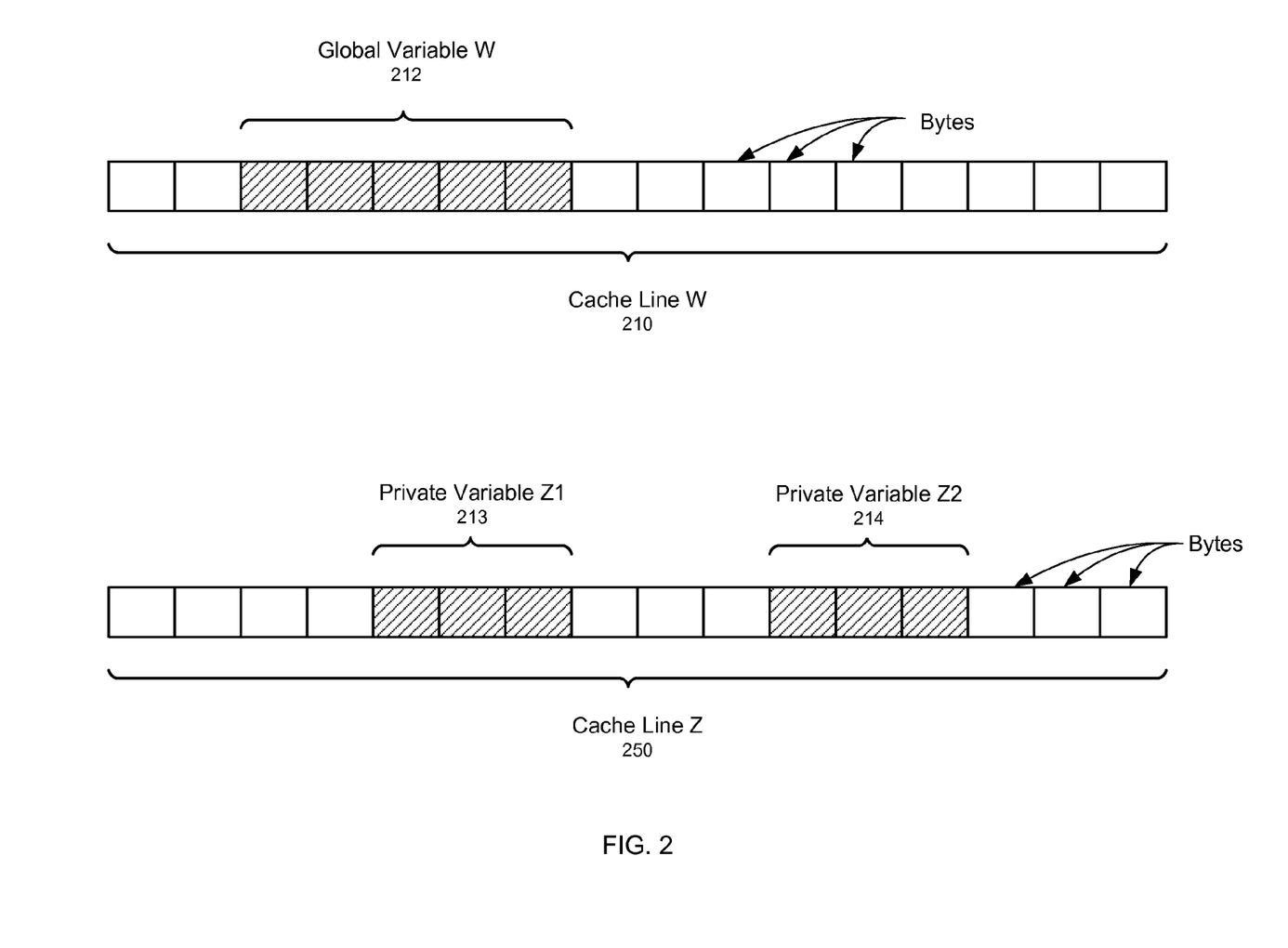
FIG. 2 shows cache lines in accordance with one or more embodiments of the invention.

FIG. 2 shows multiple cache lines (i.e., Cache Line W (210), Cache Line Z (250)) in accordance with one or more embodiments of the invention. The cache lines (210, 250) may correspond to either of cache line A (113) or cache line B (133), discussed above in reference to FIG. 1.

As shown in FIG. 2, a cache line (210, 250) may include shared resources (e.g., Global Variable W (212)) and/or private variables (i.e., Private Variable Z1 (213), Private Variable Z2 (214)). Multiple threads may concurrently issue requests to access Cache Line W (210) in order to read from and/or write to Global Variable W (212). This is an example of true sharing (i.e., multiple threads concurrently issuing requests to access the same byte(s) in a cache line). Alternatively, one thread may issue a request to access Cache Line Z (250) in order to read from and/or write to Private Variable Z1 (213), while a different thread may concurrently issue a request to access Cache Line Z (250) in order to read from and/or write to Private Variable Z2 (214). This is an example of false sharing (i.e., multiple threads concurrently issuing requests to access non-overlapping bytes in a cache line). A single cache line may have both shared resources and private variables.

Referring back to FIG. 1, each cache (111, 131) includes one or more address chains (115, 135) corresponding to the stored cache lines (113, 133). The address chains (115, 135) control/track the order in which requests for cache lines (113, 133) are processed. Specifically, Address Chain A (115) dictates the order in which threads (107, 109, 127, 129) access Cache Line A (113). Similarly, Address Chain B (135) dictates the order in which threads (107, 109, 127, 129) access Cache Line B (133).

Figure 3:
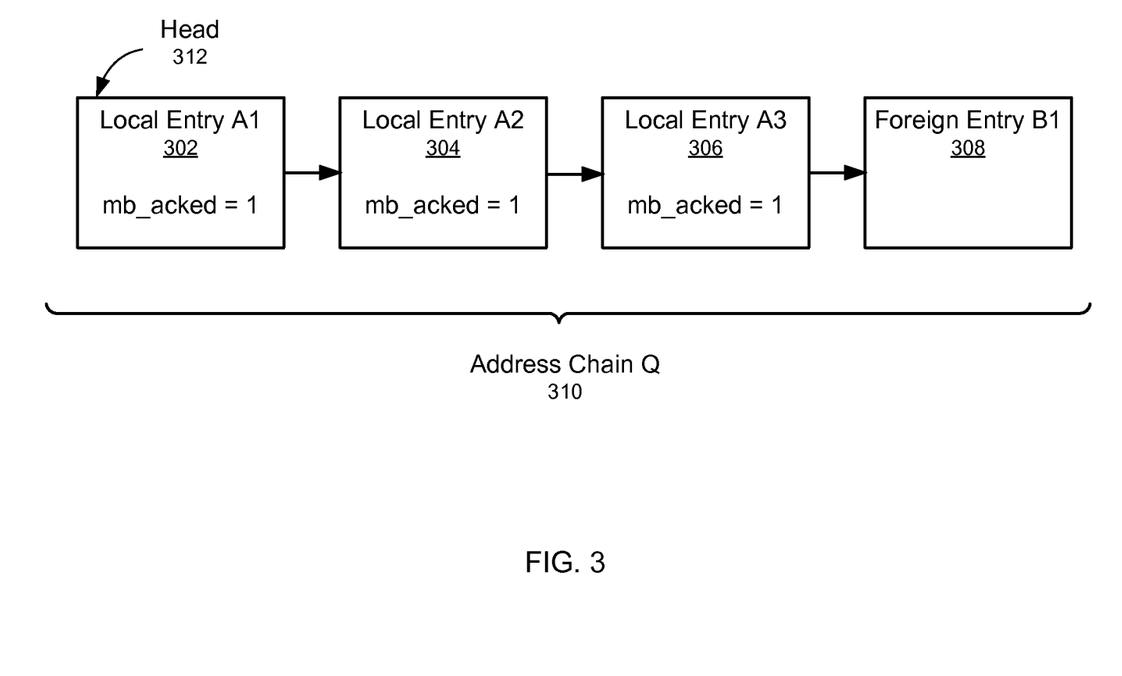
FIG. 3 shows an address chain in accordance with one or more embodiments of the invention.

FIG. 3 shows an address chain (i.e., Address Chain Q (310)) in accordance with one or more embodiments of the invention. Address Chain Q (310) is an example of Address Chain A (115), discussed above in reference to FIG. 1. As shown in FIG. 3, Address Chain Q (310) includes multiple local entries (i.e., Local Entry A1 (302), Local Entry A2 (304), Local Entry A3 (306), etc.) and at least one foreign entry (i.e., Foreign Entry B1 (308)). The local entries (302, 304, 306) correspond to requests by local threads (e.g., Thread A1 (107), Thread AN (109)) (i.e., local requests) to access Cache Line A (113). The foreign entry B1 (308) corresponds to a request by a foreign thread (e.g., Thread B1 (127)) (i.e., foreign request) to access Cache Line A (113).

In one or more embodiments of the invention, if multiple threads executing on Multithreaded Processor A (105) issue store requests to Cache Line A (113), local entries (302, 304, 306) corresponding to these "local" stores are created and inserted into Address Chain Q (310). The "local" stores are processed in the order that they are received. In other words, they are processed serially (i.e., only one member of the chain is processed at any given time). In one or more embodiments of the invention, Address Chain Q (310) is structured such that if the oldest request in the chain (i.e., the entry at the head (312)) is a Request To Own (RTO) (e.g., a store, a SWAP operation, a compare-and-swap (CAS) operation, etc.), all local entries in the chain are guaranteed to complete before the cache line is relinquished to a foreign request. In other words, Foreign Entry B1 (308) corresponding to a foreign request by a foreign thread (e.g., Thread B1 (127), Thread BN (129)) is pended behind the youngest local entry in the address chain (310) if the head (312) of the address chain (310) is an RTO, allowing all local chain members to complete before the foreign request gets processed.

As discussed above, the multi-socketed system (100) includes the central ordering unit (102). The central ordering unit (102) selects requests (i.e., requests issued by the threads) to be active in the system (100), and issues serialization acknowledgements to the threads selected to be active. In one or more embodiments of the invention, each local entry (302, 304, 306) includes a state element called mb_acked. The state element mb_acked is set when a serialization acknowledgement from the central ordering unit (102) is received. The serialization acknowledgement indicates that the request corresponding to the local entry is now active in the system. In one or more embodiments of the invention, only the request corresponding to the entry at the head of the address chain (310) can receive a serialization acknowledgement from the central ordering unit (102).

In one or more embodiments of the invention, mb_acked is set preemptively for younger members of the address chain (310), provided that the oldest member (i.e., the entry at the head (312)) is an RTO. In other words, even if a serialization acknowledgement has not yet been received from the central ordering unit for a younger member of the address chain (310), the state element mb_acked will be set for the younger member provided an RTO is at the head of the address chain. Further, even if the original oldest member is not an RTO, when an RTO reaches the head of the chain, the address chain will be traversed to set all subsequent (i.e., younger) members' mb_acked bits (i.e., set mb_acked=1).

In one or more embodiments of the invention, the mb_acked state element is used by a foreign request to determine a location in the address chain (310) where the corresponding foreign entry B1 (308) should be inserted. In one or more embodiments of the invention, the foreign request inserts the corresponding foreign entry B1 (308) after the youngest member with mb_acked set to 1 (i.e., after Local Entry A3 (306)).

Those skilled in the art, having the benefit of this detailed description, will appreciate that if the mb_acked state were to be set only when a request receives a serialization acknowledgement from a central ordering unit (i.e., Central Ordering Unit (102), discussed above in reference to FIG. 1), since younger members of the address chain cannot send requests to the central ordering unit (102) until they get to the head of the chain, the younger members might not have their respective mb_acked bits set when the foreign request arrives. Thus, in such scenarios, Foreign Entry B1 (308) may be inserted immediately following the oldest active request (i.e., immediately following Local Entry A1 (302)) in the chain and transfer the cache line to the foreign cache when processing of Local Entry A1 (302) is complete.

Figure 4:
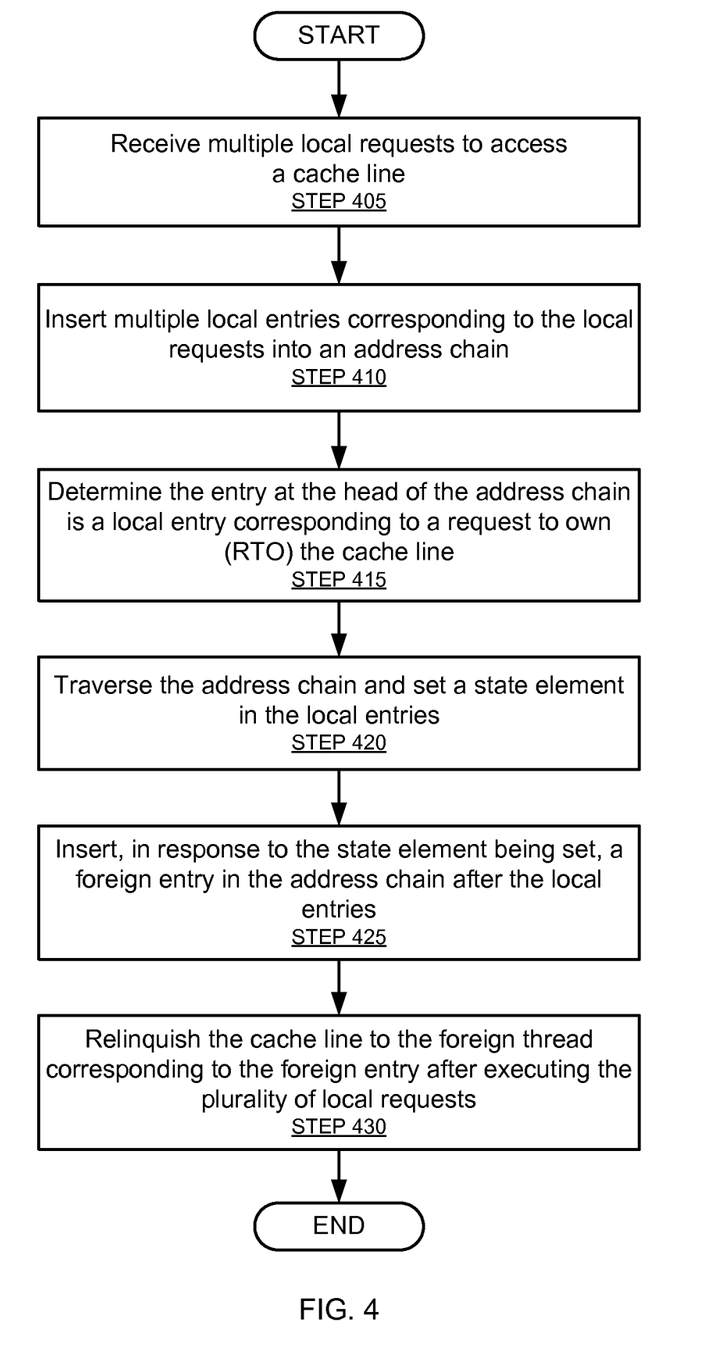
FIG. 4 shows a flowchart in accordance with one or more embodiments of the invention.

FIG. 4 shows a flowchart in accordance with one or more embodiments of the invention. The process shown in FIG. 4 may be executed by one or more components of the multi-socketed system (100). One or more steps shown in FIG. 4 may be omitted, repeated, and/or performed in a different order among different embodiments of the invention. Accordingly, embodiments of the invention should not be considered limited to the specific number and arrangement of steps shown in FIG. 4.

Initially, multiple local requests to access a cache line are received from multiple local threads executing on a local multithreaded processor (STEP 405). The cache line may include a resource shared by the multiple local threads (e.g., global variable) (i.e., true sharing) and/or the cache line may include individual private variables that are not shared by the multiple locals threads but are stored in non-overlapping bytes of the cache line (i.e., false sharing).

In STEP 410, multiple local entries corresponding to the local requests are inserted into an address chain associated with the cache line. Each local entry identifies the corresponding local thread and a state element (i.e., mb_acked). If the cache of the multithreaded processor does not already store the cache line, the cache line will need to be transferred from a foreign cache storing the cache line. However, if no foreign cache is storing the cache line, the cache line will need to be retrieved from main memory.

In STEP 415, it is determined that the local entry at the head of the address chain (i.e., head entry) corresponds to a request to own (RTO) the cache line. As discussed above, examples of requests to own include a store operation, a SWAP operation, a CAS operation, etc.

In STEP 420, the address chain is traversed in response to determining that the head entry corresponds to a RTO the cache line. In other words, the traversal of the address chain is triggered by a RTO being at the head of the address chain. During the traversal, the state element in the local entries in the address chain are set (i.e., mb_acked=1). The traversal may be executed before or after the serialization acknowledgement for the RTO head entry is received from a central ordering unit.

In STEP 425, a foreign request to access the cache line is received. The foreign request is issued by a foreign thread executing on a foreign multithreaded processor. A foreign entry for the foreign request is created and inserted into the address chain. Specifically, the foreign entry is inserted after the youngest local entry having its state element set (i.e., mb_acked=1). Accordingly, the foreign entry is effectively inserted at the tail of the address chain and all entries between the head of the address chain and the foreign entry are local entries.

In STEP 430, all the local requests are processed before the foreign request because the foreign entry is after the local entries in the address chain. Once the local requests are processed, the cache line is relinquished to the foreign thread corresponding to the foreign entry. Relinquishing the cache line to the foreign thread may include transferring the cache line from the cache of the local multithreaded processor to the cache of the foreign multithreaded processor executing the foreign thread. The relinquished cache line may be stored in a cache of the foreign processor.

Figure 5:
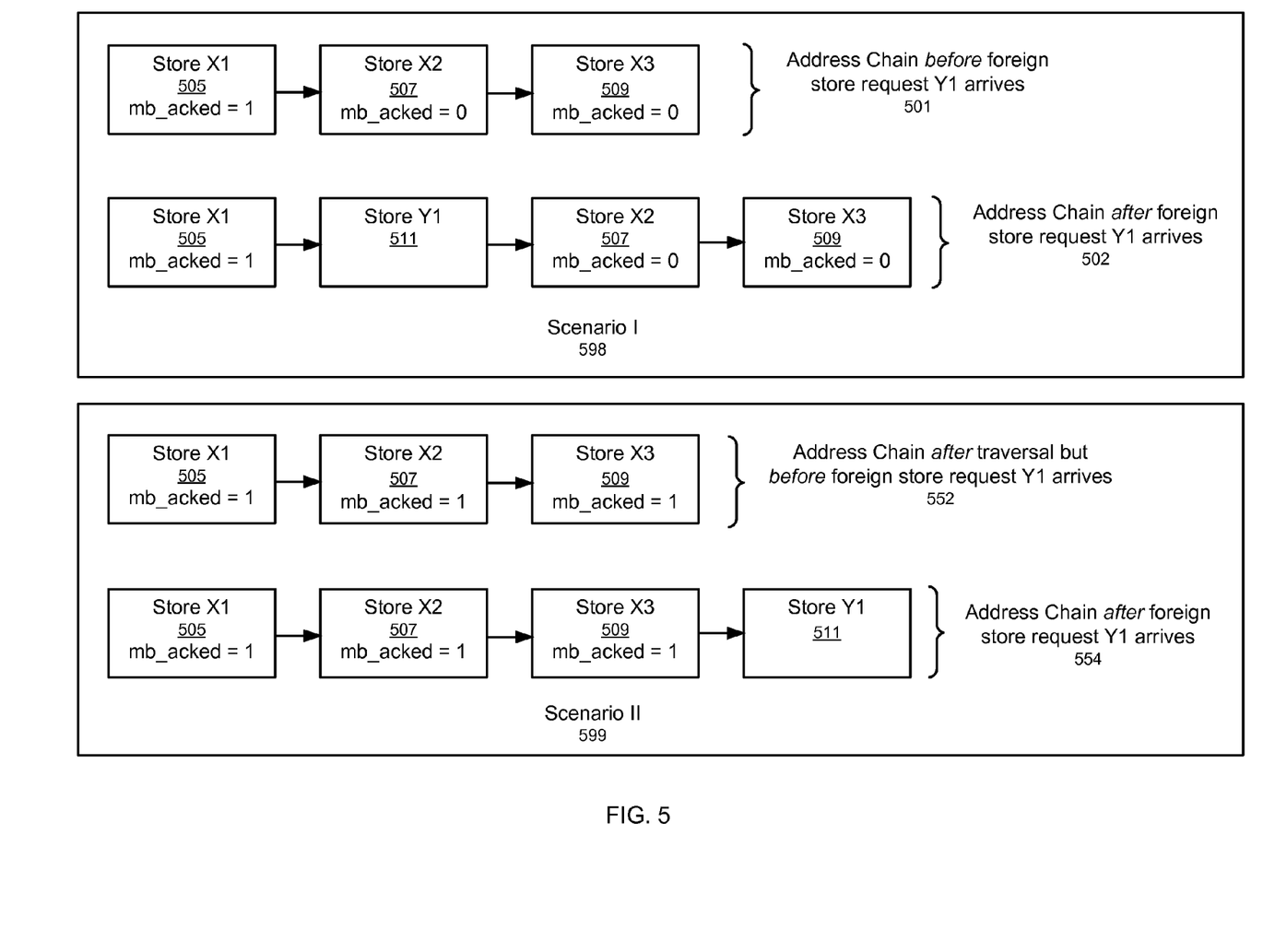
FIG. 5 shows an example in accordance with one or more embodiments of the invention.

FIG. 5 shows an example in accordance with one or more embodiments of the invention. Specifically, the example in FIG. 5 includes two scenarios: Scenario I (598) and Scenario II (599).

In Scenario I (598), multiple local store requests to access a cache line are issued by local threads. Assume the cache line is already stored in a cache of the local multithreaded processor executing the local threads. Accordingly, the address chain (501) for the cache line includes three entries (i.e., Store X1 (505), Store X2 (507), Store X3 (509)) corresponding to the store requests. Further, each entry identifies the mb_acked state element. As shown in Scenario I (598), the mb_acked state element is set (i.e., mb_acked=1) for Store X1 (505) in the address chain (501). The mb_acked state element for Store X1 (505) is set in response to receiving a serialization acknowledgement for the corresponding request from the central ordering unit. However, the mb_acked state element in the remaining entries (507, 509) is not set (i.e., mb_acked=0).

Still referring to Scenario I (598), upon arrival of a foreign store request for the cache line, a foreign entry (i.e., Store Y1 (511)) is created. As shown in the address chain (502), the foreign entry (i.e., Store Y1 (511)) is inserted immediately following the youngest local entry having the mb_acked state element set (i.e., immediately following Store X1 (505)). Accordingly, once processing of the local request corresponding to Store X1 (505) is finished, Store Y1 (511) is next in the address chain (502), and the cache line will be relinquished to the foreign multithreaded processor that issued the foreign request. The cache line will eventually need to be returned to the local multithreaded processor in order to process the remaining local entries (i.e., Store X2 (507), Store X3 (509)). The relinquishing of the cache line and return of the cache line are time expensive operations.

In Scenario II (599), multiple local store requests to access a cache line are issued by local threads. Assume the cache line is already stored in a cache of the local multithreaded processor executing the local threads. Accordingly, the address chain (552) for the cache line includes three entries (i.e., Store X1 (505), Store X2 (507), Store X3 (509)) corresponding to the store requests. Further, each entry identifies the mb_acked state element. Upon identifying the head entry in the address chain (552) as a RTO, the address chain (552) is traversed and the mb_acked state elements of all subsequent (i.e., younger) members in the address chain (552) are set, even though the younger members have not yet received a serialization acknowledgement. As shown in Scenario II (599), the mb_acked state element is set (i.e., mb_acked=1) for all entries in the address chain (552) (i.e., Store X1 (505), Store X2 (507), Store X3 (509)).

Still referring to Scenario II (599), upon arrival of a foreign store request for the cache line, a foreign entry (i.e., Store Y1 (511)) is created. As shown in the address chain (554), the foreign entry (i.e., Store Y1 (511)) is inserted immediately following the youngest local entry having the mb_acked state element set (i.e., immediately following Store X3 (509)). Accordingly, it is only after the processing of all the local requests (i.e., Store X1 (505), Store X2 (507), and Store X3 (509)) that the cache line is relinquished to the foreign multithreaded processor that issued the foreign request. By processing all the local requests before the cache line is relinquished, the cache line is not repeatedly transferred between the local and foreign processors and the delays resulting from the repeated transfers of the cache line are reduced. Scenario II (599) may be implemented using the multi-socketed system (100), discussed above in reference to FIG. 1, and/or the process discussed above in reference to FIG. 4.

As yet another example, assume there exists a local multithreaded processor executing eight (8) local threads and a foreign processor executing eight (8) foreign threads. Further, assume that all eight local thread and all eight foreign threads want to make updates to the same cache line. Further still, assume that intra-socket latency (i.e., latency to transfer access of cache line between local threads) is 20 ns while inter-socket latency (i.e., latency to transfer access between a local thread and a foreign thread) is 100 ns, and initially it takes 100 ns to fetch the cache line from memory to the cache in the local multithreaded processor, which issues the first request. In Scenario I (598), the cache line will get repeatedly transferred between the local multithreaded processor and the foreign multithreaded processor, and the incremental delay between access grants will be 100 ns, or in other words, 16*100 ns=1600 ns of total time used for all 16 threads to make their respective updates. In Scenario II (599), all eight threads in the local multithreaded processor will get to make their updates to the cache line, taking 100 ns+(7*20 ns)=240 ns before relinquishing the cache line to the foreign multithreaded processor. All 8 threads in the foreign multithreaded processor will then be able to take their turns to update the cache line, again taking 100 ns+(7*20 ns)=240 ns. The total time taken for all 16 threads to complete their updates is 240 ns+240 ns=480 ns in Scenario II (599), vs. 1600 ns in Scenario I (598).

Figure 6:
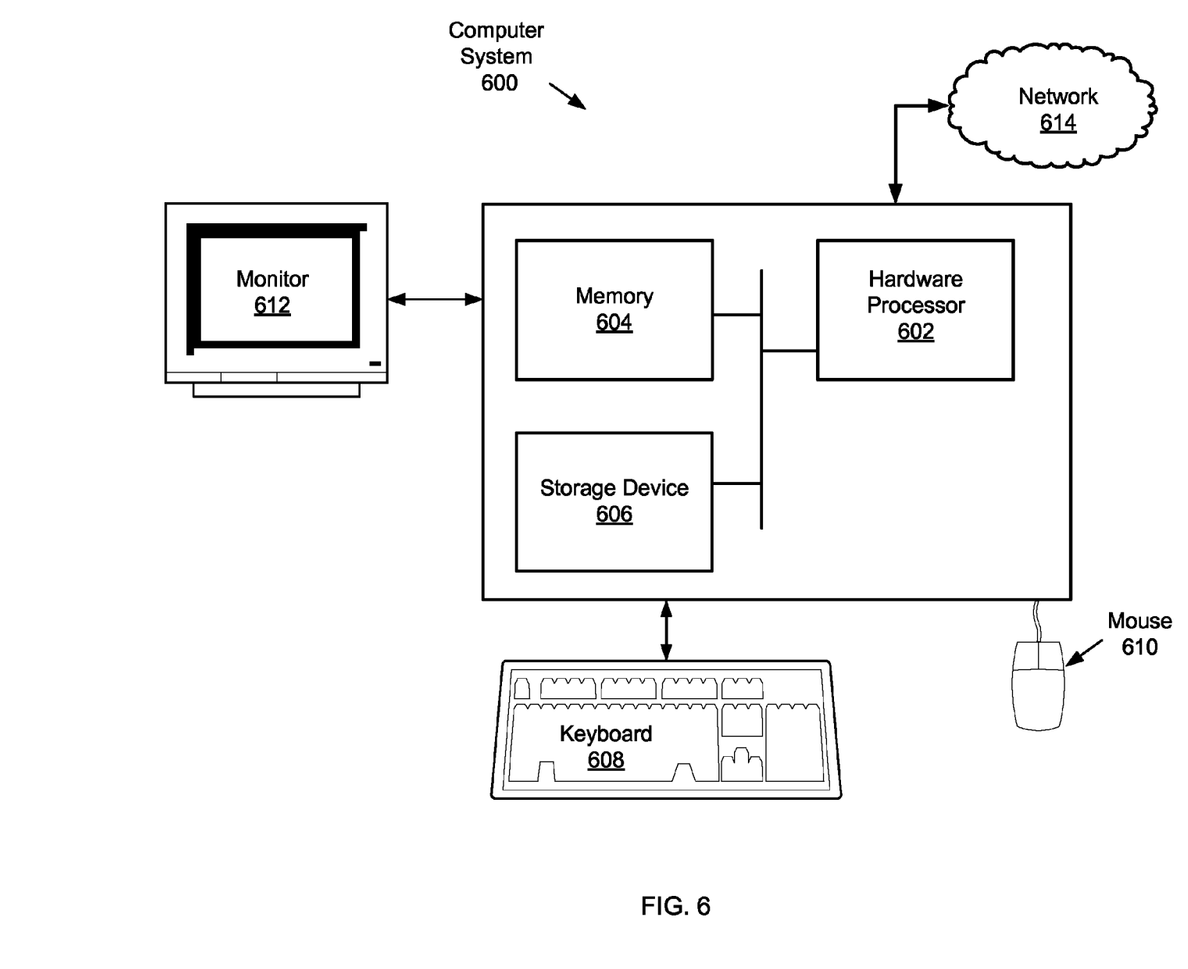
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602) (such as a central processing unit (CPU), integrated circuit, etc.), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a solid state memory device, a tape, memory, or any other non-transitory tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method for managing a cache line, comprising:
receiving, from a plurality of local threads executing on a local multithreaded processor, a plurality of local requests to access the cache line;
inserting, into an address chain associated with the cache line, a plurality of entries corresponding to the plurality of local requests;
identifying a first entry of the plurality of entries at a head of the address chain;

initiating, in response to identifying the first entry at the head and in response to the first entry corresponding to a request to own (RTO) the cache line, a traversal of the address chain;

setting, during the traversal of the address chain, a state element identified in a second entry of the plurality of entries, wherein the state element corresponds to a serialization acknowledgement from a central ordering unit for a local request corresponding to the second entry;

receiving, from a foreign thread executing on a foreign multithreaded processor, a foreign request to access the cache line;

inserting, in response to setting the state element, a third entry corresponding to the foreign request into the address chain after the second entry; and relinquishing, in response to inserting the third entry after the second entry in the address chain, the cache line to the foreign thread after executing the plurality of local requests.

2. The method of claim 1, further comprising:

retrieving, in response to receiving at least one of the plurality of local requests, the cache line from a memory operatively connected to the local multithreaded processor; and storing the cache line in a cache of the local multithreaded processor, wherein the cache line comprises a global variable for the plurality of local threads and the foreign thread.

3. The method of claim 1, wherein the cache line comprises a plurality of private variables for the plurality of local threads.

4. The method of claim 1, further comprising:

receiving, after initiating the traversal, a serialization acknowledgement from the central ordering unit for a local request corresponding to the first entry in the address chain.

5. The method of claim 1, wherein foreign request corresponds to a store operation.

6. The method of claim 1, wherein the RTO is a SWAP operation.

7. The method of claim 1, wherein relinquishing the cache line to the foreign thread comprises storing the cache line in a cache of the foreign multithreaded processor.

8. A non-transitory computer readable storage medium storing instructions for managing a cache line, the instructions comprising functionality to:

receive, from a plurality of local threads executing on a local multithreaded processor, a plurality of local requests to access the cache line;

insert, into an address chain associated with the cache line, a plurality of entries corresponding to the plurality of local requests;

identify a first entry of the plurality of entries at a head of the address chain;

initiate, in response to the first entry being indentified at the head and in response to the first entry corresponding to a request to own (RTO) the cache line, a traversal of the address chain;

set, during the traversal of the address chain, a state element identified in a second entry of the plurality of entries, wherein the state element corresponds to a serialization acknowledgement from a central ordering unit for a local thread corresponding to the second entry;

receive, from a foreign thread executing on a foreign multithreaded processor, a foreign request to access the cache line;

insert, in response to the state element being set, a third entry corresponding to the foreign request into the address chain after the second entry; and relinquish, in response to the third entry being inserted after the second entry in the address chain, the cache line to the foreign thread after executing the plurality of local requests.

9. The non-transitory computer readable storage medium of claim 8, the instructions further comprising functionality to:

retrieve, in response to receiving at least one of the plurality of local requests, the cache line from a memory operatively connected to the local multithreaded processor; and store the cache line in a cache of the local multithreaded processor, wherein the cache line comprises a global variable for the plurality of local threads and the foreign thread.

10. The non-transitory computer readable storage medium of claim 8, wherein the cache line comprises a plurality of private variables for the plurality of local threads.

11. The non-transitory computer readable storage medium of claim 8, the instructions further comprising functionality to:

receive, after initiating the traversal, a serialization acknowledgement from the central ordering unit for a local request corresponding to the first entry in the address chain.

12. The non-transitory computer readable storage medium of claim 8, wherein foreign request corresponds to a store operation.

13. The non-transitory computer readable storage medium of claim 8, wherein the RTO is a SWAP operation.

14. The non-transitory computer readable storage medium of claim 8, wherein the instructions to relinquish the cache line to the foreign thread comprise functionality to:

store the cache line in a cache of the foreign multithreaded processor.

15. A system for managing a cache line, comprising:

a plurality of local threads executing on a local multithreaded processor and issuing a plurality of local requests to access the cache line;

a foreign thread executing on a foreign multithreaded processor and issuing a foreign request to access the cache line; and a local cache storing the cache line and comprising an address chain storing a plurality of local entries corresponding to the plurality of local requests and a foreign entry corresponding to the foreign request, wherein the local cache is configured to set, during a traversal of the address chain, a state element identified in the plurality of local entries and corresponding to a serialization acknowledgement from a central ordering unit, wherein the foreign entry is inserted into the address chain after the plurality of local entries in response to the state element being set, and wherein the cache line is relinquished to the foreign thread after the plurality of local requests are executed in response to the foreign entry being inserted into the address chain after the plurality of local entries.

16. The system of claim 15, wherein the traversal is initiated in response to a head of the address chain being a request to own (RTO) the cache line.

17. The system of claim 16, wherein the RTO is a CAS operation.

18. The system of claim 15, further comprising:
a foreign cache configured to store the cache line after the cache line is relinquished to the foreign thread.

19. The system of claim 15, wherein the cache line comprises a plurality of private variables for the plurality of local threads.

20. The system of claim 15, further comprising:
a memory operatively connected to the local multithreaded processor and the foreign multithreaded processor,
wherein the cache line is retrieved from the memory in response to at least one of the plurality of local requests, and
wherein the cache line comprises a global variable for the plurality of local requests and the foreign request.

* * * * *

UNITED STATES PATENT AND TRADEMARK OFFICE
CERTIFICATE OF CORRECTION

PATENT NO. : 8,527,712 B2  
APPLICATION NO. : 13/220286  
DATED : September 3, 2013  
INVENTOR(S) : Cheung et al.

It is certified that error appears in the above-identified patent and that said Letters Patent is hereby corrected as shown below:

On the title page, item [56] column 2, under other publications, line 1, delete "Serach" and insert  
    -- Search --, therefor.

Signed and Sealed this  
Seventeenth Day of December, 2013

Margaret A. Focarino  
*Commissioner for Patents of the United States Patent and Trademark Office*